US008479362B2

(12) United States Patent
Scruggs

(10) Patent No.: US 8,479,362 B2
(45) Date of Patent: Jul. 9, 2013

(54) BODY SECURITY IN NON-HORIZONTAL BURIALS

(76) Inventor: Donald E. Scruggs, Chino, CA (US)

( * ) Notice: Subject to any disclaimer, the term of this patent is extended or adjusted under 35 U.S.C. 154(b) by 0 days.

(21) Appl. No.: 13/373,612

(22) Filed: Nov. 21, 2011

(65) Prior Publication Data

US 2013/0111718 A1 May 9, 2013

Related U.S. Application Data

(63) Continuation-in-part of application No. 12/587,829, filed on Oct. 14, 2009, now Pat. No. 8,104,153.

(51) Int. Cl.
*A01N 1/00* (2006.01)
*A61G 17/00* (2006.01)

(52) U.S. Cl.
USPC ................................................ 27/21.1; 27/28

(58) Field of Classification Search
USPC ........................................................ 27/19, 20
See application file for complete search history.

(56) References Cited

U.S. PATENT DOCUMENTS 3,348,280 A * 10/1967 Myers ................................ 27/2
5,127,112 A * 7/1992 Brock ................................ 27/1
5,715,583 A * 2/1998 Sandoval .......................... 27/11
7,703,186 B1 * 4/2010 Williamson ....................... 27/2

FOREIGN PATENT DOCUMENTS

FR 2847804 A1 * 6/2004

* cited by examiner

*Primary Examiner* — Susan Su

(57) ABSTRACT

A method whereby a body is held securely in a dignified position within a non-horizontal burial container so as to not crumple downward when interred.

2 Claims, 2 Drawing Sheets

BODY SECURITY IN NON-HORIZONTAL BURIALS

CROSS-REFERENCE TO RELATED APPLICATIONS

Continuation in Part of Non-Horizontal Burial Methods, application Ser. No. 12/587,829 of Oct. 14, 2009 now U.S. Pat. No. 8,104,153

FEDERALLY SPONSORED RESEARCH

Not Applicable

SEQUENCE LISTING OR PROGRAM

Not Applicable

FIELD OF THE INVENTION

This invention relates to safely securing bodies in a dignified position within burial containers to be set into the ground in any position.

BACKGROUND OF THE INVENTION

A current practice for interring bodies is to dig a large hole in the ground and store the removed material for later covering the burial container and re-filling the hole. The burial container is lowered into the large hole and the removed material is placed and tamped around and on the burial container. Ground covering is then placed over the top, to restore the original appearance of the area, and the surplus receiving material is removed. To save cemetery space and reduce the cost of labor an often practiced method is to set a casket into the ground in a vertical position. This practice causes the body to crumple into the foot end of the burial container, the thought of which usually stresses loved ones.

If a hole is dug in a high water table area, the hole soon fills with water. Such cases present a near impossible problem in digging a grave site. Screw-in or self digging burial containers solve the problem. They do not require large pre-dug holes, but can be simply screwed or bored into the usually damp ground and with the present invention the body remains in a dignified and upright position.

OBJECTS OF THE INVENTION

It is an object of this invention to provide an economical means by which a body will not crumple to the foot end of a non-horizontally placed burial container.

OPERATING PRINCIPALS AND PREFERRED EMBODIMENT

The preferred embodiment of this invention is to place a body into a form fitting body tray, cover it with a flexible sheet shroud, attached firmly to the body tray and place it into in a non-horizontal burial container. The spaces between the shroud and body tray are then packed with padding to mitigate movement.

Figure 1:
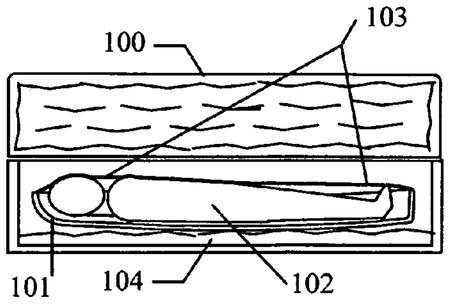
FIG. 1 is a cut-away view of a body, 102, resting on a form fitted body tray, 101, laid upon padding, 104, within a reinforced conventional appearing casket, 100, with a flexible material shroud, 103, firmly attached to the body tray, securely holding the body in place.
Figure 2:
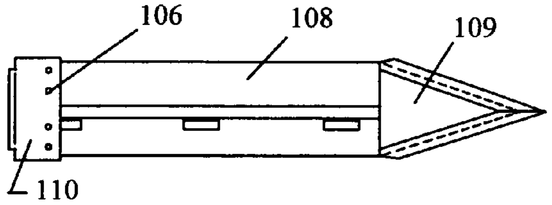
FIG. 2 is a side view of a reinforced casket, 108, as the one in FIG. 1, with a driver head, 110, installed with hardware, 106, a reaming head, 109, installed on its foot end.
Figure 3:
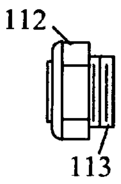
FIG. 3 is a side view of an end cap with threads, 113, to fit a non-horizontal burial container and driver head flats, 112, to be gripped and manipulated by a positioning and rotating device.
Figure 4:
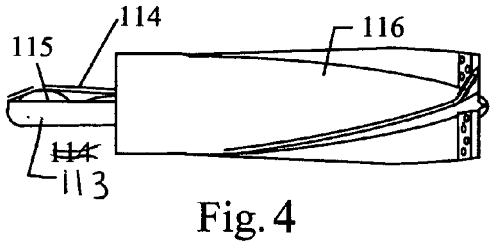
FIG. 4 is a side view of a self boring burial container, 116, and a body, 115, in a form fitting body tray, 113, covered with a firmly attached flexible material shroud, 114, being inserted into the burial container.
Figure 5:
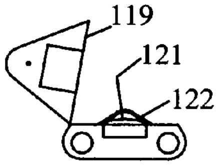
FIG. 5 is an end view of a triangular cross section burial container with its lid, 119, raised and a body, 121, in a body tray covered with a firmly attached flexible material shroud, 122.
Figure 6:
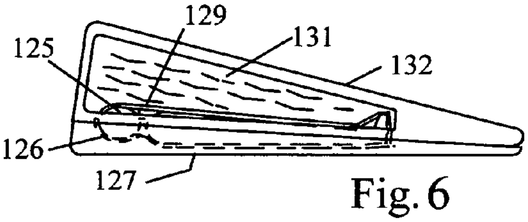
FIG. 6 is a side view of a burial container, 132, as in FIG. 5, showing a body, 125, a body tray, 126, a firmly attached flexible material shroud, 129, and padding, 131, inside the lid.
Figure 7:
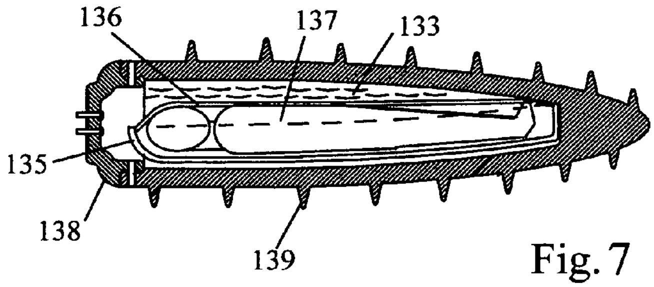
FIG. 7 is a cut away side view of a screw-in burial container, 139, with its end cap, 138, in place and having a body, 137, in a form fitting body tray, 135, covered with a flexible material shroud, 136, firmly attached to the body tray, and padding, 133.
Figure 8:
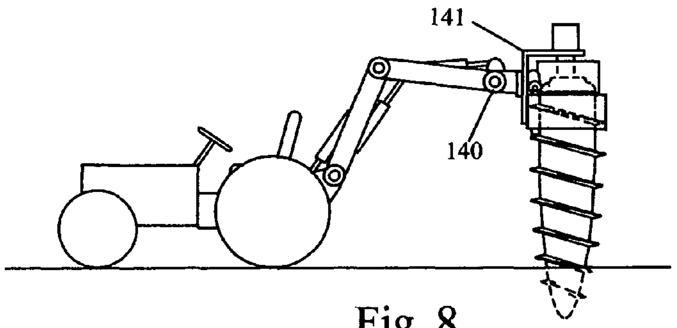
FIG. 8 is a side view of a cemetery vehicle with a work-arm, 140, on which is attached a positioning a rotating device, 141, interring a screw-in non-horizontal burial container inside of which is a body secured by the subject invention.
Figure 9:
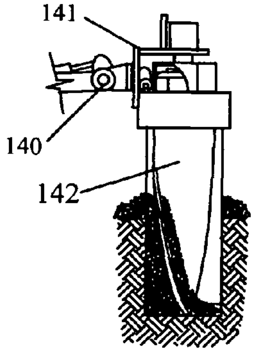
FIG. 9 is a side view of a work-arm, 140, on which is attached a positioning and rotating device, 141, interring a self boring non-horizontal burial container in which is a body secured by the subject invention.
Figure 10:
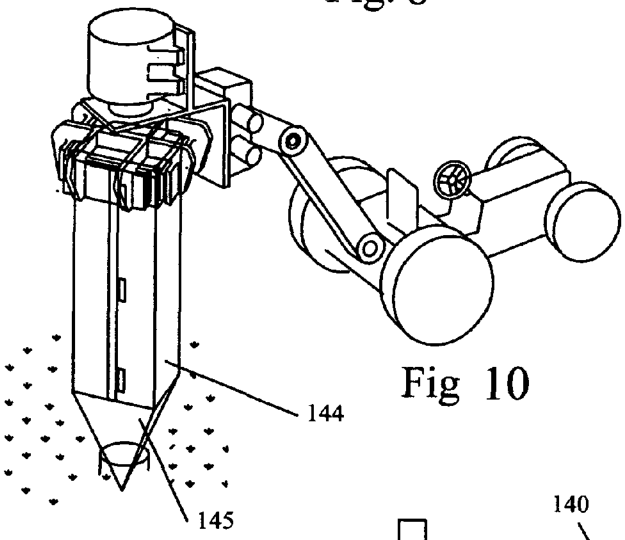
FIG. 10 is a view of a cemetery vehicle with a positioning and rotating device interring a reinforced casket, 144, having a reaming head, 145, as those shown in FIGS. 1 and 2, in which is a body secured by the subject invention.
Figure 11:
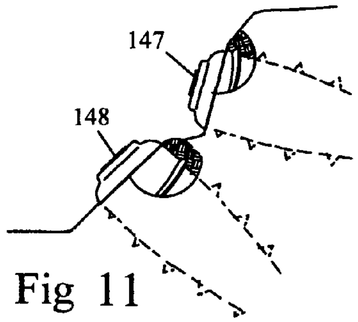
FIG. 11 is a side view showing two possible positions, 147 and 148, for non-horizontal burial containers in which a body is secured by the subject invention.
Figure 12:
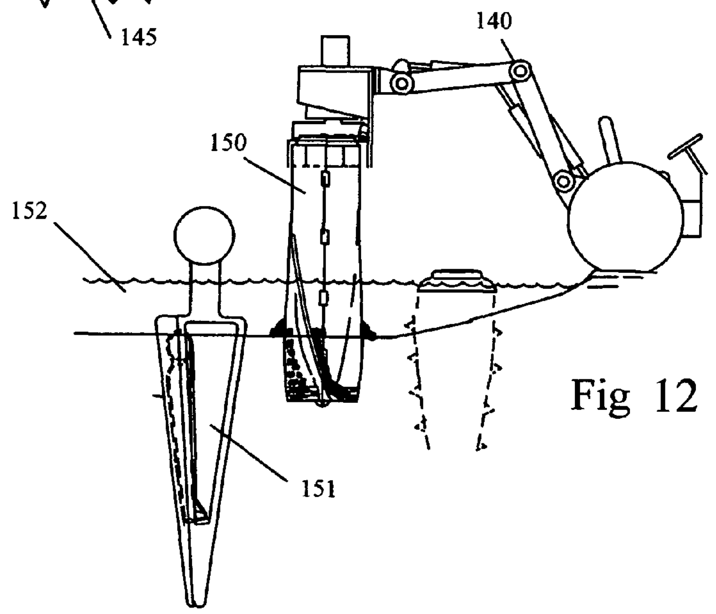
FIG. 12 is a side view of a cemetery vehicle with a work-arm, 140, setting a self boring burial container, 150, with a body inside, into a pond, 152, next to a self-reaming burial container, 151, in which a body is secured by the subject invention, illustrating several of the non-horizontal burial containers in which the subject invention is used.

I claim:

1. A burial process comprising:

wrapping a body in a flexible sheet material;

placing the body in the flexible sheet material in a padded body tray;

placing the padded body tray, along with the body in the flexible sheet material that lies in the padded body tray, into a burial container through an opening at a longitudinal end of the burial container;

sealing the opening of the burial container by screwing an end cap head piece; and injecting or pouring a curing and setting material into the burial container through holes opposite the padded body tray, thereby pressing and holding the body securely into the body tray.

2. A burial process comprising:

completely surrounding a body in a flexible sheet material;

placing the body in the flexible sheet material into a burial container through an opening at a longitudinal end of the burial container;

sealing the opening of the burial container by screwing an end cap head piece; and injecting or pouring an expanding and setting foam material into the burial container through holes spaced along a longitudinal length of the burial container, wherein the expanding and setting foam material surrounds the body.

* * * * *